US006966935B1

(12) United States Patent
Neighbors et al.

(10) Patent No.: US 6,966,935 B1
(45) Date of Patent: Nov. 22, 2005

(54) FILTER CLEANER FOR WET/DRY VACUUM

(76) Inventors: Thomas J. Neighbors, 269 Crestwood Dr., Avon Lake, OH (US) 44012; Peter L. Barrett, 14615 Rainbow Rd., Cleveland, OH (US) 44111

( * ) Notice: Subject to any disclaimer, the term of this patent is extended or adjusted under 35 U.S.C. 154(b) by 0 days.

(21) Appl. No.: 10/638,246

(22) Filed: Aug. 11, 2003

(51) Int. Cl.[7] .......................... B65B 1/04; B65B 31/04
(52) U.S. Cl. ..................... 55/385.1; 55/493; 55/476; 55/480; 55/486; 55/488; 55/498; 55/506; 55/510; 55/518; 96/135; 96/136; 96/149; 95/287; 141/65; 141/231; 141/329; 141/333; 222/5; 222/83.5
(58) Field of Search .................. 55/480, 476, 498, 55/506, 492, 510, 518, 291, 292, 302, 337, 55/459.1, DIG. 3, 486, 488, 493, 385.1; 15/353; 95/287; 96/135, 136, 149; 141/65, 231, 329, 141/333; 222/5, 83.5

(56) References Cited

U.S. PATENT DOCUMENTS

| 3,775,951 | A | * | 12/1973 | Eichholz et al. ............... 55/417 |
| 3,998,656 | A | * | 12/1976 | Grotto .......................... 134/33 |
| 4,488,883 | A |   | 12/1984 | Philp |
| 4,767,427 | A | * | 8/1988  | Barabas et al. ............... 55/493 |
| 4,818,398 | A | * | 4/1989  | Lott et al. .................... 210/238 |
| 4,944,780 | A | * | 7/1990  | Usmani ........................ 55/337 |
| 5,057,129 | A |   | 10/1991 | Kierzkowski et al. |
| 5,558,697 | A |   | 9/1996  | Dyson et al. |
| 5,741,351 | A | * | 4/1998  | Beal et al. ..................... 95/279 |
| 5,783,086 | A |   | 7/1998  | Scanlon et al. |
| 5,961,677 | A |   | 10/1999 | Scott |
| 6,093,237 | A | * | 7/2000  | Keller et al. .................. 95/287 |
| 6,183,526 | B1 |  | 2/2001  | Suzuki |
| 6,346,130 | B2 |  | 2/2002  | Suzuki |
| 6,562,093 | B2 |  | 5/2003  | Oh |
| 6,569,218 | B2 | * | 5/2003  | Dudley ....................... 55/385.1 |
| 6,638,344 | B2 | * | 10/2003 | Horton et al. ................ 95/280 |
| 6,685,758 | B1 | * | 2/2004  | Bennett et al. ............. 55/385.1 |
| 6,846,349 | B2 | * | 1/2005  | Eom ............................ 95/277 |
| 2001/0047721 | A1 | | 12/2001 | Scanlon |
| 2002/0108204 | A1 | | 8/2002  | Buss et al. |
| 2002/0124729 | A1 | * | 9/2002  | Dudley ........................ 95/282 |

* cited by examiner

*Primary Examiner*—Duane Smith
*Assistant Examiner*—Minh-Chau T. Pham
(74) *Attorney, Agent, or Firm*—John D. Gugliotta; P. Jeff Martin (57) ABSTRACT

A filter cleaner for wet/dry vacuum is provided for effectively cleaning filter cartridges employed for use in a class of vacuum cleaners commonly referred to as "wet/dry vacs." The filter cleaner apparatus includes a cylindrical catch tank supported by a base. The catch tank supports an attachable circular lid. A motor cover, which is disposed atop the circular lid, is mounted with a handle. Housed within catch tank is an electric motor which spinably drives an upper filter plate via a rotatable shaft. A lower filter plate assembly housed within catch tank includes a rotatable lower filter plate being spring-biased in an upward manner. The lower filter plate assembly further includes a debris directional funnel which directs debris to a removable collection tray.

18 Claims, 7 Drawing Sheets

FILTER CLEANER FOR WET/DRY VACUUM

RELATED APPLICATIONS

The present invention was first described in Disclosure Document Request submitted for Registration on May 21, 2003 under 35 U.S.C. §122, 37 C.F.R. §1.14, and MPEP §1706. There are no previously filed, nor currently any co-pending applications, anywhere in the world.

BACKGROUND OF THE INVENTION

1. Field of the Invention

The present invention relates generally to filter cleaners and, more particularly, to a filter cleaner for wet/dry vacuums.

2. Description of the Related Art

Numerous vacuum devices which effectively suction both wet and dry materials have gained wide popularity. These devices generally have a sizeable holding tank and a suction mechanism mounted along its top. A hose serves to draw materials into the tank. These vacuum devices are a member of a class of vacuum cleaners commonly referred to as "wet/dry vacs." These wet/dry vacs are sold by a number of companies under trademarks including SHOP VAC®, GENIE®, SEARS CRAFTSMAN®, HOOVER®, BLACK & DECKER®, and RIGID®. These devices include a filter element for containing debris within the tank.

However, after vacuuming under harsh conditions, specifically suctioning fine, dry particles and other debris, the filter becomes quickly obstructed necessitating replacement thereof.

Accordingly, a need has arisen for a means by which filter cartridges employed for use in wet/dry vacuum systems can be effectively cleaned and thus recycled for use in a manner which is quick, easy, and efficient. The development of the filter cleaner for wet/dry vacuums fulfills this need and facilitates extension of filter element life.

A search of the prior art did not disclose any patents that read directly on the claims of the instant invention; however, the following references were considered related.

The following patents disclose a filter apparatus for use in combination with a canister for removing toxic substances from a vaporous fuel generated in a fuel tank for an internal combustion engine:

U.S. Pat. No. 6,346,130 B2, issued in the name of Suzuki; and

U.S. Pat. No. 6,183,526 B1, issued in the name of Suzuki.

U.S. Pat. No. 5,558,697, issued in the name of Syson et al. discloses a dual cyclonic vacuum cleaner having a first cyclone designed to remove relatively large particles from the airflow, a second cyclone designed to remove fine dust particles from the airflow, and a plurality of bleed valves arranged therebetween.

U.S. Patent Application No. 2002/0108204 A1, filed in the name of Buss et al. discloses a vacuum cleaner having an electric motor for driving an impeller which creates suction and for driving a pump impeller which draws liquid material from the bottom of the tank and expels it therefrom.

U.S. Pat. No. 4,488,883, issued in the name of Philp discloses a vacuum bag cleaning system that eliminates cleaning vacuum cleaner bags by hand and instead provides a vacuum exhausted compartment into which a cloth vacuum cleaner bag is placed and dirt encrusted thereon is blown from the pores of the bag by a concentrated current of air.

U.S. Patent Application No. 2001/0047721 A1, filed in the name of Scanlon discloses an improved vacuum cleaner bag and method of operation.

U.S. Pat. No. 5,057,129, issued in the name of Kierzkowski et al. discloses a moisture separator for filtering air being provided to a marine power plant.

U.S. Pat. No. 5,961,677, issued in the name of Scott discloses an improved filter for a vacuum cleaner exhaust to remove particles exhausted by vacuum cleaner.

U.S. Pat. No. 5,783,086, issued in the name of Scanlon et al. discloses a hydrophobic and air permeable filter for a wet/dry vacuum cleaner for wet material collection.

U.S. Pat. No. 6,562,093 B2, issued in the name of Oh discloses a cyclone dust collecting device which is mounted on a telescopic extension pipe of a vacuum cleaner to filter out and collect contaminants of relatively large particles drawn into vacuum cleaner.

Consequently, a need has been felt for a means by which filter cartridges employed for use in wet/dry vacs can be cleaned in a manner which is quick, easy, and efficient.

SUMMARY OF THE INVENTION

Therefore, it is an object of the present invention to provide a device for effectively cleaning filter cartridges employed for use in wet/dry vacs.

It is another object of the present invention to provide a device for effectively cleaning filters which allows used filters to be recycled.

It is another object of the present invention to provide a removably attachable lid which seats atop a catch tank.

It is another object of the present invention to provide an upper filter plate and a lower filter plate housed inside the catch tank for compressing a filter cartridge therebetween.

It is another object of the present invention to provide a motor for generating centrifugal force.

It is another object of the present invention to provide a depressible switch for enabling and disabling motor operation.

It is another object of the present invention to provide a timer control circuit for supplying voltage to the electric motor for a selected time period.

It is still another object of the present invention to provide a collection tray being removable in a slidable manner to facilitate easy disposal of dirt and debris removed from a soiled filter.

Briefly described according to one embodiment of the present invention, a filter cleaner for wet/dry vacuum is adapted for effectively cleaning filter cartridges employed for use in a class of vacuum cleaners commonly referred to as "wet/dry vacs." The filter cleaner apparatus comprises an elongated, cylindrical catch tank supported by a base. The catch tank supports a circular lid being attachable thereto via a plurality of latches.

A motor cover is disposed atop the circular lid which provides an electric motor with a barrier against dust, dirt, and debris. A handle is mounted atop motor cover which serves to aid in removal of the circular lid as well as to facilitate ease in transport of the present invention. The electric motor is mounted to the floor of lid via a plurality of fasteners. The motor includes a rotatable shaft having an upper filter plate perpendicularly coupled to a lower end thereof. The motor spinably drives upper filter plate via shaft at a number of revolutions per minute (RPM). An electric cord connects the motor to an alternating current power supply through a depressible power switch. The depressible power switch is depressed thereby actuating operation of motor. To disenable motor, the depressible power switch is released.

A lower filter plate assembly comprises a debris directional funnel mounted horizontally to an inner circumferential sidewall of catch tank. The debris directional funnel functions to direct debris having been centrifugally removed from the filter cartridge to a removable collection tray.

In order to provide vertical support to a lower shaft, a lower support platform is mounted to the inner circumferential sidewall of catch tank above debris directional funnel. A lower bearing is disposed inside lower support platform and is penetrated with a lower shaft which is functional to spin and translate longitudinally.

The lower filter plate assembly further comprises a generally convex-shaped lower filter plate has a circular central cavity within which an upper end of lower shaft is perpendicularly coupled. A compression spring, which encircles lower shaft, is mounted between lower filter plate and lower support platform. The compression spring is biased upwardly in order to facilitate optimal pressure being applied to a filter cartridge placed in an upright manner between upper filter plate and lower filter plate, thereby securely holding filter cartridge in place during a filter cleaning cycle without causing destruction thereto. An annular retainer, mounted circumferentially to a lower end of lower shaft, prevents removal of lower shaft from the lower support platform.

The use of the present invention provides an effective means for cleaning filter cartridges employed for use in wet/dry vacs in a manner which is quick, easy, and efficient, thus prolonging the life of the filter.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Referring now to FIGS. 1–4, a filter cleaner for wet/dry vacuum 10 is shown, according to the present invention, adapted for effectively cleaning filter cartridges 100 employed for use in a class of vacuum cleaners commonly referred to as "wet/dry vacs." These wet/dry vacs are sold by a number of companies under trademarks including SHOP VAC®, GENIE®, SEARS CRAFTSMAN®, HOOVER®, BLACK & DECKER®, and RIGID®. The present invention utilizes centrifugal force to impel dirt and debris away from filter sheet material 102 of a filter cartridge 100 (shown in FIG. 5). The filter cleaner for wet/dry vacuum 10 is comprised of a catch tank 20 supported by a base 30 mounted thereunder. The catch tank 20 is of an elongated, cylindrical configuration defining an anterior end 22 opposite a posterior end 24. The base 30 is generally circular in cross-section having an outwardly directed, circumferential sidewall 33, wherein sidewall 33 diverges outwardly with increased distance from the posterior end 24 of catch tank 20, and terminates into a planar bottom 36.

Figure 8:
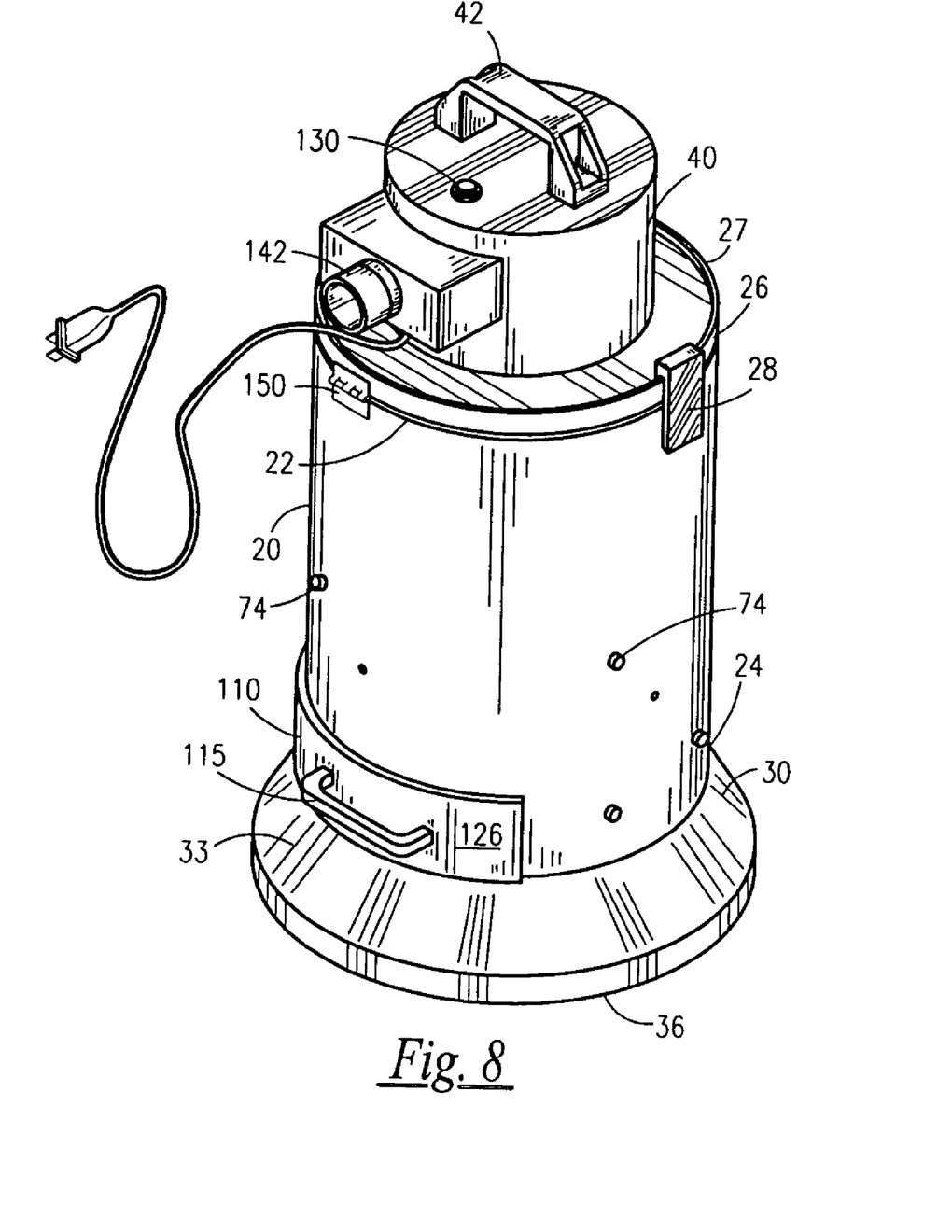
FIG. 8 is an alternate embodiment showing the circular lid hingedly attached to the catch tank.

The catch tank 20 supports a circular lid 26 being attachable thereto via a plurality of latches 28 pivotally affixed to catch tank 20. Each of the plurality of latches 28 includes a flange 29 for engaging a raised lip 27 defining an outer periphery of the lid 26. It is envisioned that alternatively, the circular lid 26 is hingedly attached to catch tank 20 via a hinge 150 in order to allow the circular lid 26 to openly pivot away from catch tank 20 (shown as an alternate embodiment in FIG. 8).

A motor cover 40 is disposed atop circular lid 26 which provides an electric motor 50 with a barrier against dust, dirt, and debris. A handle 42 is mounted atop motor cover 40 which serves to aid in removal of the circular lid 26 as well as to facilitate ease in transport of the filter cleaner for wet/dry vacuum 10.

Figure 1:
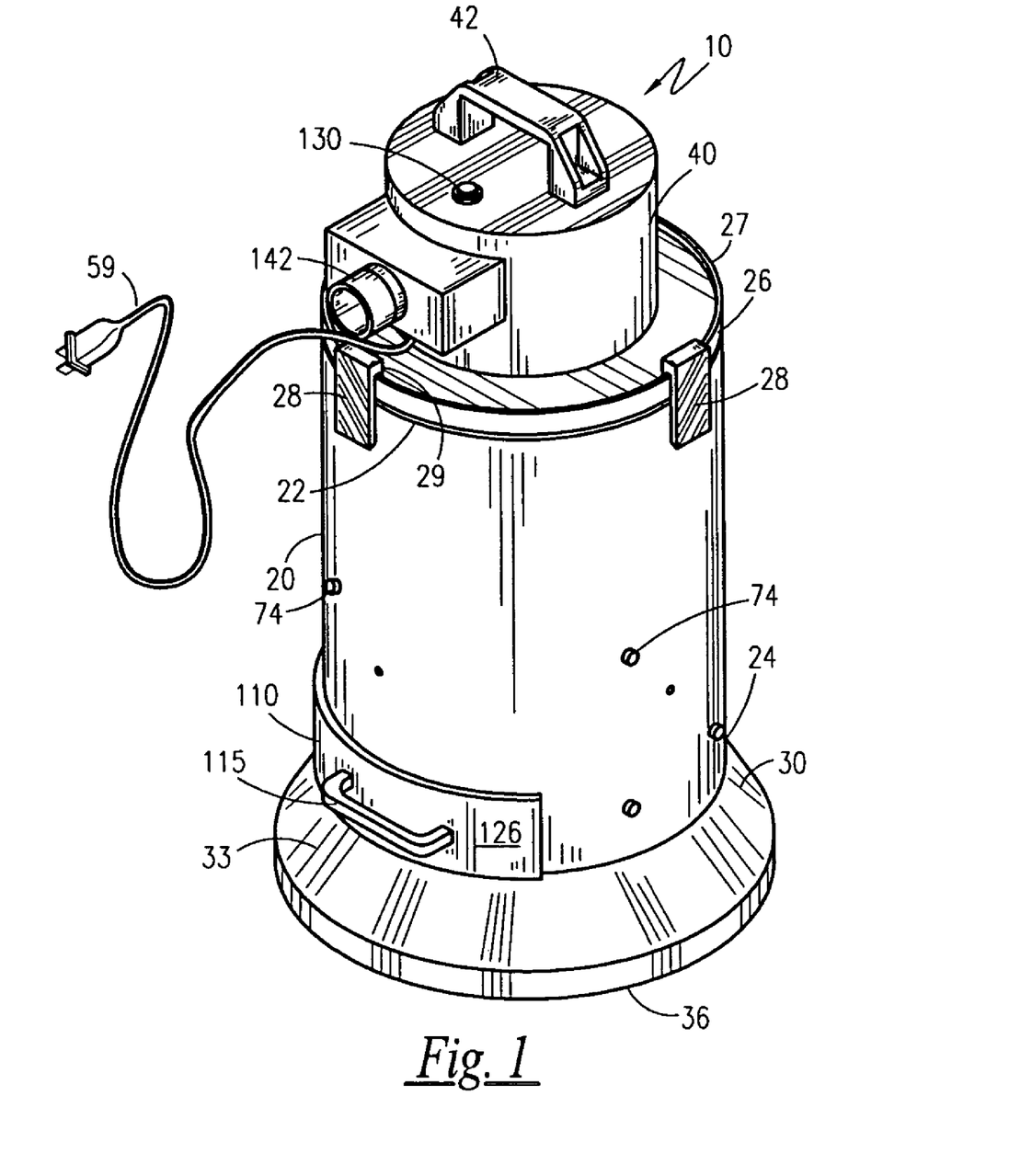
FIG. 1 is a perspective view of a filter cleaner for wet/dry vacuum according to the preferred embodiment of the present invention.
Figure 2:
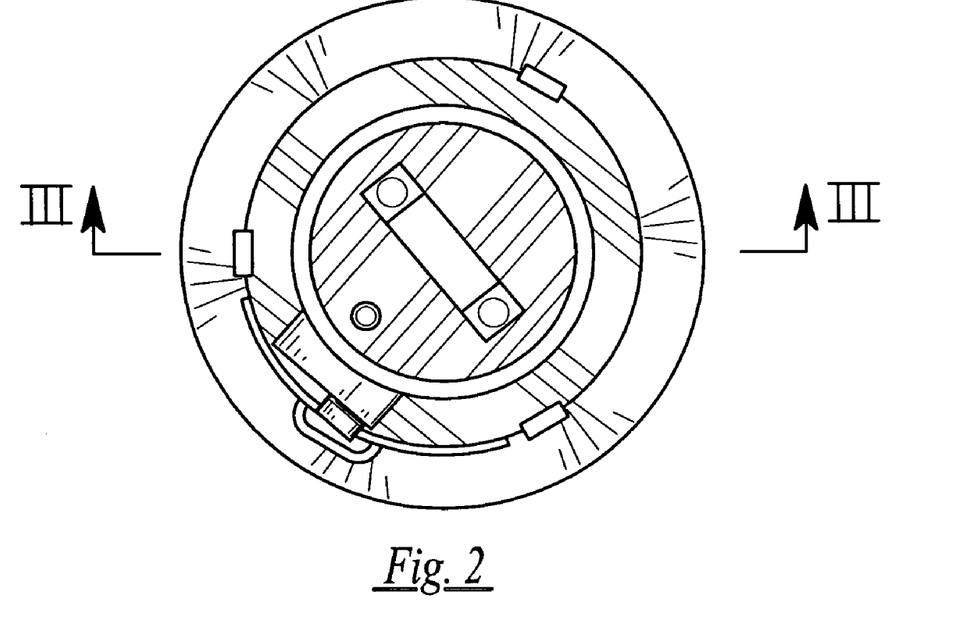
FIG. 2 is a top plan view thereof.
Figure 3:
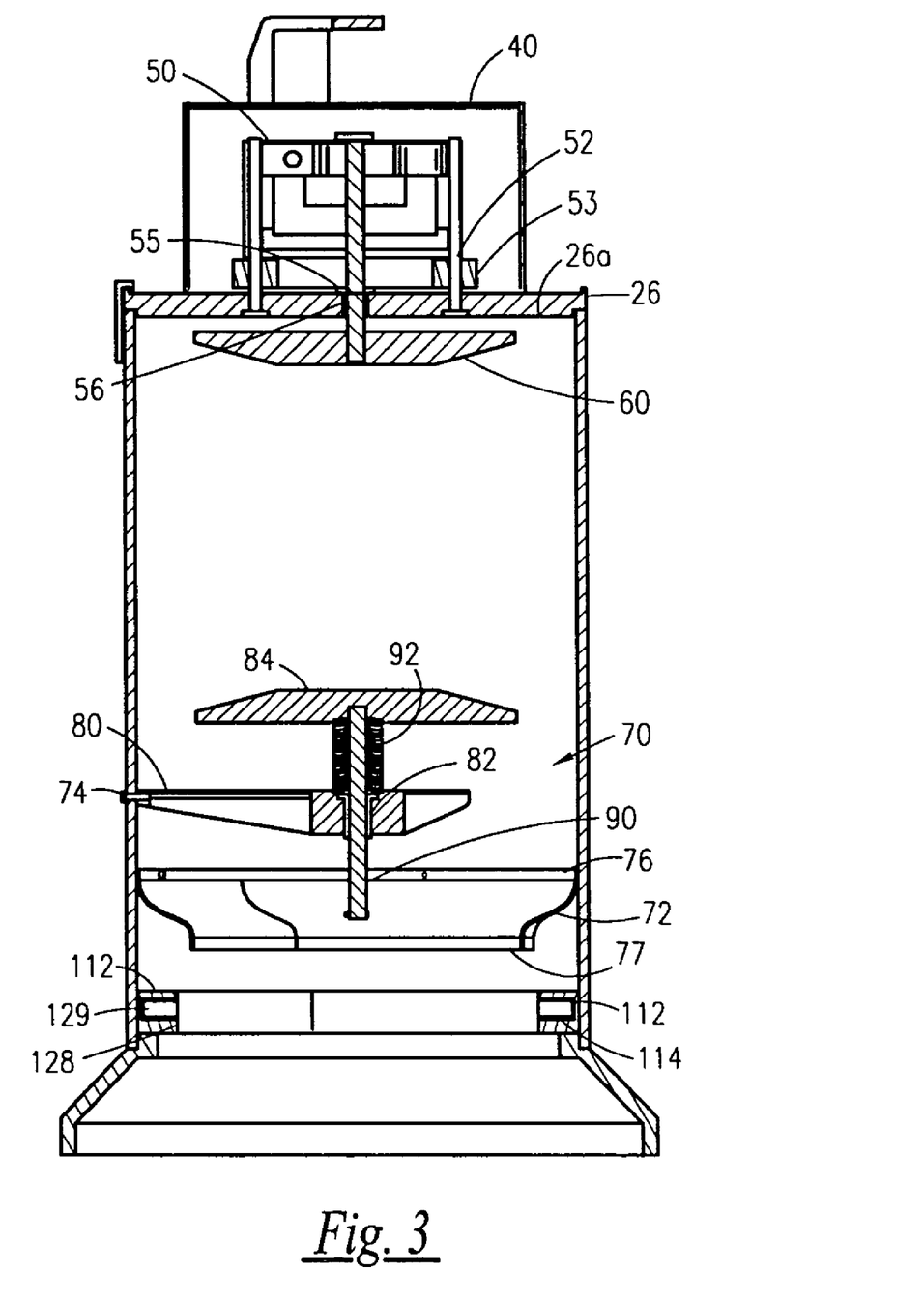
FIG. 3 is a cross-sectional view taken along lines III—III of FIG. 2 according to the preferred embodiment of the present invention.
Figure 7:
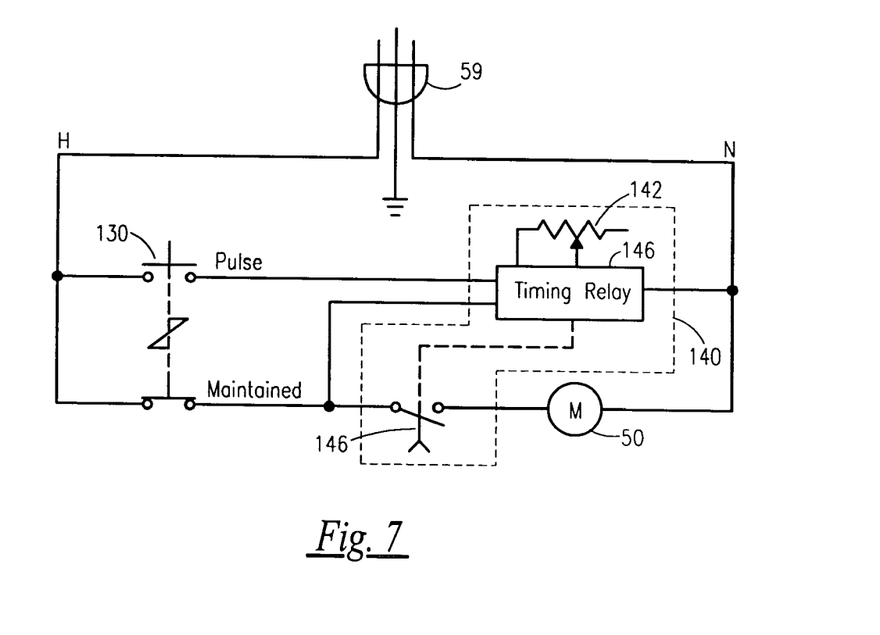
FIG. 7 is a schematic diagram of the preferred embodiment of the electrical circuitry.

Referring more specifically to FIGS. 1, 3, and 7, the electric motor 50 is mounted to a floor 26a of lid 26 via a plurality of fasteners 52, shown herein as fastening spacers 53. The electric motor 50 includes a rotatable shaft 55 which penetrates an upper bearing 56 disposed centrally inside lid 26. A generally convex-shaped upper filter plate 60 has a circular, central cavity within which a lower end of shaft 55 is perpendicularly coupled. The electric motor 50 defines 110 volts-alternating current for spinably driving upper filter plate 60 via shaft 55 at an optimal number of revolutions per minute (RPM). An electric cord 59 connects the motor 50 to an alternating current power supply through a depressible power switch 130 located atop motor cover 40. The depressible power switch 130 is depressed closing electrical circuit which transfers flow of electric power to electric motor 50 actuating operation thereof. The depressible power switch 130 is held in a depressed position for a filter cleaning cycle time period. It is envisioned that an optimal cycle time period for effectively cleaning a filter cartridge 100 is approximately 15 seconds and the optimal number of RPMs being approximately 1000. In order to terminate the filter cleaning cycle, the depressible power switch 130 is released, thus opening electrical circuit so as to interrupt flow of electric power to motor 50 and causing disablement thereof. A timer control circuit 140, actuated via an operational dial 142, for supplying voltage to the electric motor 50 for a selected time period, is provided. The operational dial 142 is set to a selected time period, and depressible power switch 130 is depressed. The timer control circuit 140 is in electrical communication with depressed power switch 130. The timer control circuit 140 includes a timer mechanism 144 for enabling operation of motor 50 for the selected time period. The timer mechanism 144 is actuated for the selected time period, and motor 50 continues to operate while timer mechanism 144 is engaged. A motor disabling means 146 is electrically coupled to timer mechanism 144, whereupon expiration of selected time period, the timer mechanism 144 disengages and resets, and motor disabling means 146 disables motor 50 operation.

Figure 4:
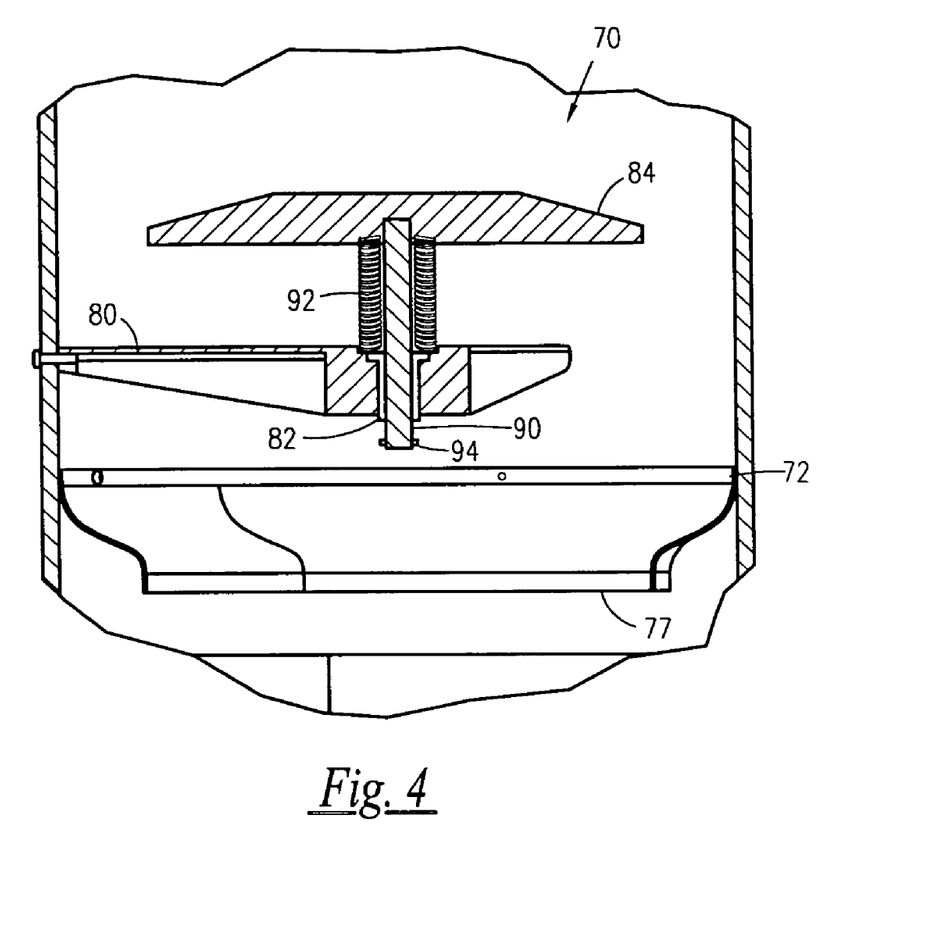
FIG. 4 is a partial cross-sectional view of the present invention illustrating the lower filter plate assembly according to the preferred embodiment.

Referring now to FIGS. 3 and 4, a lower filter plate assembly 70 comprises a debris directional funnel 72 mounted horizontally to an inner circumferential sidewall of catch tank 20 via a plurality of coupling elements 74. The debris directional funnel 72 is of a cylindrical configuration having an inwardly directed, circumferential sidewall, wherein sidewall converges inwardly with increased distance from a rim 76 of debris directional funnel 72 and terminates into a debris transferal opening 77. The debris directional funnel 72 functions to direct debris having been centrifugally removed from the filter cartridge 100 to a collection tray 110 (to be described in greater detail below).

In order to provide vertical support to a lower shaft 90, a lower support platform 80 is mounted via a coupling element 74 to the inner circumferential sidewall of catch tank 20 above debris directional funnel 72. A lower bearing 82 is disposed inside lower support platform 80 and is penetrated with lower shaft 90 which is functional to spin and translate longitudinally.

Figure 5:
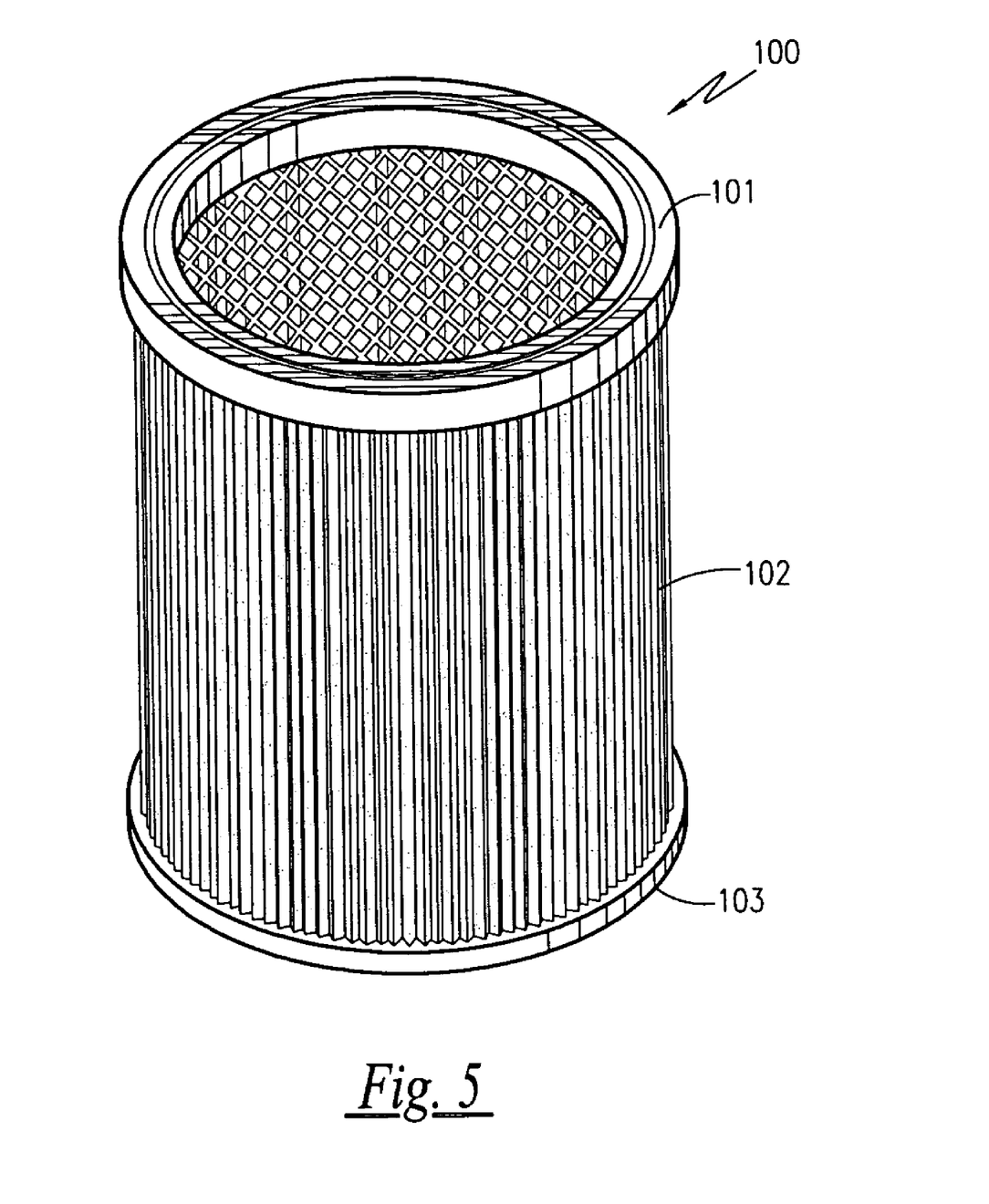
FIG. 5 is a perspective view of a filter cartridge.

A generally convex-shaped lower filter plate 84 has a circular central cavity within which an upper end of lower shaft 90 is perpendicularly coupled. A compression spring 92, which encircles lower shaft 90, is mounted between lower filter plate 84 and lower support platform 80. The compression spring 92 is biased upwardly in order to facilitate optimal pressure being applied to a filter cartridge 100 placed in an upright manner between upper filter plate 60 and lower filter plate 84, thereby securably holding filter cartridge 100 in place during a filter cleaning cycle without causing destruction thereto. An annular retainer 94, mounted circumferentially to a lower end of lower shaft 90, prevents removal of lower shaft 90 from the lower support platform 80. The filter cartridge 100 is shown in FIG. 5 and includes an upper end cap 101 and a lower end cap 103 with filter sheet material 102 located therebetween.

Figure 6:
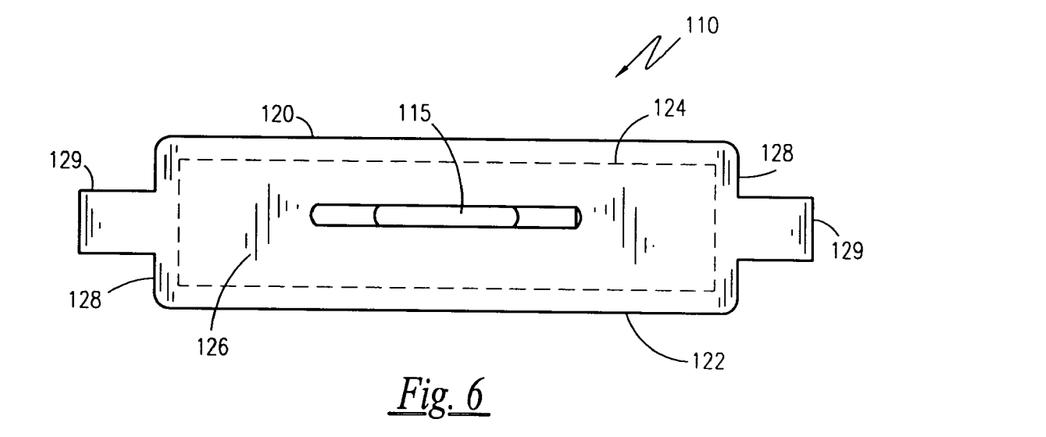
FIG. 6 is a front end view of the collection tray according to the preferred embodiment of the present invention.

Referring now to FIGS. 1, 3, and 6, in order to facilitate easy disposal of removed dirt and debris, a collection tray 110 is provided. A tray-guidance track 112 is mounted to opposing circumferential, inner sidewalls of catch tank 20, just above the posterior end 24 thereof. The tray-guidance track 112 defines a generally C-shaped, elongated configuration having a recess 114 formed therein. The collection tray 110 defines an open top portion 120 opposing a bottom 122, a rear wall 124 opposing a front wall 126, and a pair of opposed, arcuate sidewalls 128. Each of the pair of opposed, arcuate sidewalls 128 includes a shoulder 129 projecting outwardly therefrom for slidably engaging a respected recess 114 of the tray-guidance track 112. The front wall 126 of the collection tray 110 is provided with a handle 115 to allow for easy opening and closing thereof.

It is envisioned that various embodiments of motor driving means may be utilized for spinably driving upper filter plate 60. These include a 6–24 volt direct current electric motor which includes a rechargeable battery pack, a direct current driven motor wherein a field voltage manipulation means controls RPMs, a pneumatic or hydraulic drive motor, a mechanically driven motor adapted to accommodate a standard cordless or corded electric drill for mechanically driving motor, and a gear-driven motor with manual hand crank.

It is further envisioned that the filter cleaner for wet/dry vacuum 10 includes an adaptor adapted to accommodate connection to a standard twelve volt direct current vehicle battery for supplying power to the device, and an adaptor adapted so as to accommodate European electric requirements. In addition, an alternating current inverter speed controller is envisioned to facilitate frequency manipulation to control RPMs. It is still further envisioned that a filter plate adaptor is adapted for use with the filter plate to removably hold a filter cartridge from an outer lip portion thereof.

2. Operation of the Preferred Embodiment

To use the present invention, user releases the plurality of latches 28 and removes circular lid 26. A soiled filter cartridge is centrally placed in an upright manner atop lower filter plate 84. User next directs circular lid 26 above catch tank 20 and slowly presses downward until circular lid 26 seats atop catch tank 20, and reattaches plurality of latches 28, thus causing compression of compression spring 92 to a proper height in order to facilitate optimal pressure being applied to end caps 101, 103 of the filter cartridge 100, and thereby securably holding filter cartridge 100 in place while being centrifuged during a filter cleaning cycle without causing destruction thereto. User depresses depressible power switch 130 to actuate operation of electric motor 50. The depressible power switch 130 is held in a depressed position for a filter cleaning cycle time period. In order to terminate the filter cleaning cycle, user releases the depressible power switch 130 causing disablement of electric motor 50. User next releases the plurality of latches 28, removes circular lid 26, and removes cleaned filter cartridge. Finally, user slidably opens and removes the collection tray 110 and disposes of dust and debris contained therein in a responsible manner.

The use of the present invention provides an effective means for cleaning filter cartridges employed for use in wet/dry vacs in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be broadly limited only by the following claims.

What is claimed is:

1. The filter cleaner comprising:
a catch tank, said catch tank is of an elongated, cylindrical configuration defining an anterior end opposite a posterior end;
a base, said base is mounted below said catch tank to provide support thereto, wherein said base is generally circular in cross-section having an outwardly directed, circumferential sidewall, wherein said circumferential sidewall diverges outwardly with increased distance from said posterior end of said catch tank and terminates into a planar bottom;

a circular lid, said circular lid is attachable to said catch tank via a plurality of latches being pivotally affixed to said catch tank;

a motor cover, said motor cover is disposed atop said circular lid;

an electric motor, said electric motor is housed within said motor cover, said electric motor is mounted to a floor of said circular lid via a plurality of fasteners, and wherein said electric motor spinably drives an upper filter plate housed inside said catch tank;

a lower filter plate assembly said lower filter plate assembly housed inside said catch tank below said upper filter plate; and a timer control circuit, said timer control circuit supplies voltage to said electric motor.

2. The filter cleaner of claim 1, wherein said circular lid includes a raised lip defining an outer periphery of said circular lid.

3. The filter cleaner of claim 1, wherein each of said plurality of latches includes a flange for engaging said raised lip of said circular lid.

4. The filter cleaner of claim 1, wherein said upper filter plate defines a generally convex shape, and wherein said upper filter plate has a circular, central cavity.

5. The filter cleaner of claim 1, wherein said electric motor includes a rotatable shaft which penetrates an upper bearing disposed centrally inside said circular lid, said rotatable shaft having a lower end perpendicularly coupled within said circular, central cavity of said upper filter plate, said electric motor is adapted to spinably drive said upper filter plate via said rotatable shaft at an optimal number of revolutions per minute.

6. The filter cleaner of claim 1, wherein said electric motor is connected via an electric cord to an alternating current power supply through a depressible power switch, said depressible power switch is located atop said motor cover, said depressible power switch is depressed closing an electrical circuit which transfers flow of electric power to said electric motor actuating operation of said electric motor, said depressible power switch is held in a depressed position for an optimal filter cleaning cycle time period, whereupon said depressible power switch is released thus opening the electrical circuit so as to interrupt flow of electric power to said electric motor and causing disablement of said electric motor, and thus terminating the filter cleaning cycle.

7. The filter cleaner of claim 1, further comprising a collection tray to facilitate easy disposal of removed dirt and debris, said collection tray defines an open top portion opposing a bottom, a rear wall opposing a front wall, and a pair of opposed, arcuate sidewalls, wherein each of said pair of opposed, arcuate sidewalls includes a shoulder projecting outwardly therefrom.

8. The filter cleaner of claim 7, wherein said shoulder of each of said pair of opposed, arcuate sidewalls is adapted to slidably engage a respected recess of a tray-guidance track.

9. The filter cleaner of claim 8, wherein said tray-guidance track defines a generally C-shaped, elongated configuration having said recess formed therein, said tray-guidance track is mounted to opposing circumferential, inner sidewalls of said catch tank, just above said posterior end of said catch tank.

10. The filter cleaner of claim 7, wherein said front wall of said collection tray is provided with a handle to allow for easy opening and closing of said collection tray.

11. The filter cleaner of claim 1, wherein said timer control circuit is actuated via an operational dial, said timer control circuit is in electrical communication with said depressed power switch, said optional dial is set to a selected time period, whereupon said depressible power switch is subsequently depressed.

12. The filter cleaner of claim 11, wherein said timer control circuit includes a timer mechanism for enabling operation of said electric motor for the selected time period, said timer mechanism is actuated during the selected time period, and said electric motor continues to operate while said timer mechanism is engaged, said timer mechanism is electrically coupled to a motor disabling means, whereupon expiration of the selected time period, said timer mechanism disengages and resets, and said motor disabling means disables said electric motor operation.

13. The filter cleaner of claim 1, wherein said motor cover has a handle mounted thereatop, wherein said handle serves to aid in removal of said circular lid as well as to facilitate ease in transport of said filter cleaner.

14. The filter cleaner of claim 1, wherein said plurality of fasteners are fastening spacers.

15. The filter cleaner of claim 6, wherein said upper filter plate is spinably driven at approximately 1000 revolutions per minute.

16. The filter cleaner of claim 6, wherein said optimal filter cleaning cycle time period is approximately 15 seconds.

17. The filter cleaner comprising:
a catch tank, said catch tank is of an elongated, cylindrical configuration defining an anterior end opposite a posterior end;

a base, said base is mounted below said catch tank provide support thereto;

a circular lid, said circular lid is attachable to said catch tank via a plurality of latches being pivotally affixed to said catch tank;

a motor cover, said motor cover is disposed atop said circular lid;

an electric motor, said electric motor is housed within said motor cover, said electric motor is mounted to a floor of said circular lid via a plurality of fasteners, and wherein said electric motor spinably drives an upper filter plate housed inside said catch tank;

a lower filter plate assembly, said lower filter plate assembly housed inside said catch tank below said upper filter plate; and a timer control circuit, said timer control circuit supplies voltage to said electric motor;

wherein said lower filter plate assembly comprises:
a debris directional funnel, said debris directional funnel is mounted horizontally to an inner circumferential sidewall of said catch tank via a plurality of coupling elements, said debris directional funnel is of a cylindrical configuration having an inwardly directed, circumferential sidewall, wherein said sidewall converges inwardly with increased distance from a rim of said debris directional funnel and terminates into a debris transferal opening;

a lower support platform, said lower support platform is mounted via a coupling element to an inner circumferential sidewall of said catch tank above said debris directional funnel said lower support platform has a lower bearing disposed therein, and wherein said lower bearing is penetrated with a lower shaft which is functional to spin and translate longitudinally;

a lower filter plate, said lower filter plate defines a generally convex shape, said lower filter plate has a circular central cavity within which an upper end of said lower shaft is perpendicularly coupled;

a compression spring, said compression spring encircles said lower shaft, and wherein said compression spring is mounted between said lower filter plate and said lower support platform, said compression spring is biased upwardly in order to facilitate optimal pressure being applied to a filter cartridge placed in an upright manner between said upper filter plate and said lower filter plate, thereby securably holding the filter cartridge in place during a filter cleaning cycle without causing destruction to the filter cartridge; and an annular retainer, said annular retainer is mounted circumferentially to a lower end of said lower shaft so as to prevent removal of said lower shaft from said lower support platform.

18. The filter cleaner of claim 17, wherein said circular lid is hingedly attached to said catch tank via a hinge in order to allow said circular lid to openly pivot away from said catch tank.

* * * * *